United States Patent [19]
Kim et al.

[11] Patent Number: 6,115,375
[45] Date of Patent: Sep. 5, 2000

[54] MULTISTAGE OPTICAL PACKET SWITCHING APPARATUS USING SELF ELECTRO-OPTIC-EFFECT DEVICES

[75] Inventors: Kwang Joon Kim; O Kyun Kwon; Kyung Sook Hyun; Seok Ho Song; El Hang Lee, all of Daejon, Rep. of Korea

[73] Assignee: Electronics and Telecommunications Research Institute, Daejon-Shi, Rep. of Korea

[21] Appl. No.: 08/967,797

[22] Filed: Nov. 10, 1997

[30] Foreign Application Priority Data

Nov. 20, 1996 [KR] Rep. of Korea ............ 96-55818

[51] Int. Cl.$^7$ ................................ H04L 12/50
[52] U.S. Cl. ................... 370/388; 370/389; 359/117
[58] Field of Search ........................ 370/369, 388, 370/386, 352, 422, 427, 479, 517, 351, 359, 389; 359/107, 344, 128, 139, 120, 115, 117, 118

[56] References Cited

U.S. PATENT DOCUMENTS 5,283,688  2/1994  Deveaud-Pledran .............. 359/344
5,369,514  11/1994 Eilenberger et al. .............. 370/369

OTHER PUBLICATIONS

R.J. Grindle et al., "Greatly enhanced logical functionality of the S–Seed for use in optical switching systems", IEEE Proceedings Journal, vol. 140, No. 2, Apr. 1993, pp. 98–106.

*Primary Examiner*—Michael Horabik
*Assistant Examiner*—Prenell Jones
*Attorney, Agent, or Firm*—Cohen, Pontani, Lieberman & Pavane

[57] ABSTRACT

A multistage optical packet switching apparatus with self electro-optic-effect device is disclosed. The apparatus is formed with multistage structure using a plurality of symmetrical self electro-optic-effect devices, self-routing being performed by the control for a header part of optical packets after self-duplication and amplification for the input optical signal. The optical packet switching apparatus using a plurality of symmetrical self electro-optic-effect devices includes a front stage having first and second self electro-optic-effect devices interconnected and a back stage having third and fourth self electro-optic-effect devices interconnected, the 1☐ multistage structure comprising the unit switching modules interconnected each comprising the front and the back stages, the self-duplication and amplification being performed in the front stage and the switching being performed in the back stage. The use of the apparatus is an optical exchange.

4 Claims, 8 Drawing Sheets

MULTISTAGE OPTICAL PACKET SWITCHING APPARATUS USING SELF ELECTRO-OPTIC-EFFECT DEVICES

FIELD OF THE INVENTION

The present invention relates to a multistage optical packet switching apparatus using Self Electro-optic-Effect Devices(SEEDs), and more particularly a multistage optical packet switching apparatus using self electro-optic-effect devices wherein an optical signal of digital packet having constant length is subject to self-duplication and amplification and switching for the signal is performed toward a desired destination.

BACKGROUND OF THE INVENTION

Communication techniques based on electronic devices have been developed outstandingly, and approached toward physical limitations thereof, and there are attempts on complete optical communication using photons, which have excellent physical limitations over electrons, to fulfill ever growing communication demands.

There have been suggested several mechanisms for photonic packet switching, wherein it is important how to determine respective destinations of packets to be transmitted.

In addition, since there are speed limitations in the method for controlling the optical signal path using an electric signal, the studies have been performed on the method for determining directly the path of the optical signal with an optical signal using non-linearity of substance.

In general, previously suggested mechanisms for this depend on the third order non-linear susceptibility $x^{(3)}$ and, since a substance with both a large reduction rate and a large transparency to fulfill the general demand has not yet found, a switching device with large volume or an optical signal with strong intensity must be used and lights with two or more wavelengths must also be used.

SUMMARY OF THE INVENTION

It is therefore an object of the present invention to provide a multistage optical packet switching apparatus wherein the optical packet signal is subject to self-duplication and amplification by means of symmetrical self electro-optic-effect devices(SEEDs) from a complete optical exchange mechanism using only an optical signal, and is subject to optical switching to self-route toward a desired destination by controlling a header part of the packet signal.

To achieve the object, according to the present invention, there is provided a multistage optical packet switching apparatus using a plurality of symmetrical self electro-optic-effect devices includes a front stage having first and second self electro-optic-effect devices interconnected and a back stage having third and fourth devices interconnected, the 1×N multistage structure comprising unit switching modules interconnected each comprising the front and the back stages; a front portion of an unit switching module in an arbitrary r-th stage receiving an input optical signal to be transmitted from an arbitrary (r−1)th unit switching module, receiving from outside a bias optical signal with constant intensity and an optical signal for detecting a state of the device, and performing self-duplication and amplification by means of a difference in signal intensities of respective bits of the optical bias and the optical input signal; and a back portion of the unit switching module in the arbitrary r-th stage receiving the self-duplicated and amplified optical signal through the front portion, receiving an optical control signal for determining destination for the input optical signal from outside, and outputting said input optical signal by varying reflectance depending on signal intensity of the bits indicating address to be outputted of bits of the self-duplicated and amplified input signal; an unit switching module in an arbitrary (r+1)th stage, which is receiving an input optical signal having relative low reflectance, outputting a meaningless optical signal through self-duplication and amplification, while the unit switching module in an arbitrary (r+1)th stage, which is receiving an input optical signal having relative high reflectance, transmitting an optical signal to be trasmitted to the following stage through the self-duplication and amplification.

BRIEF DESCRIPTION OF THE DRAWINGS

The present invention will be explained as an embodiment with reference to accompanying drawings, wherein.

DESCRIPTION OF THE PREFERRED EMBODIMENT

Figure 1:
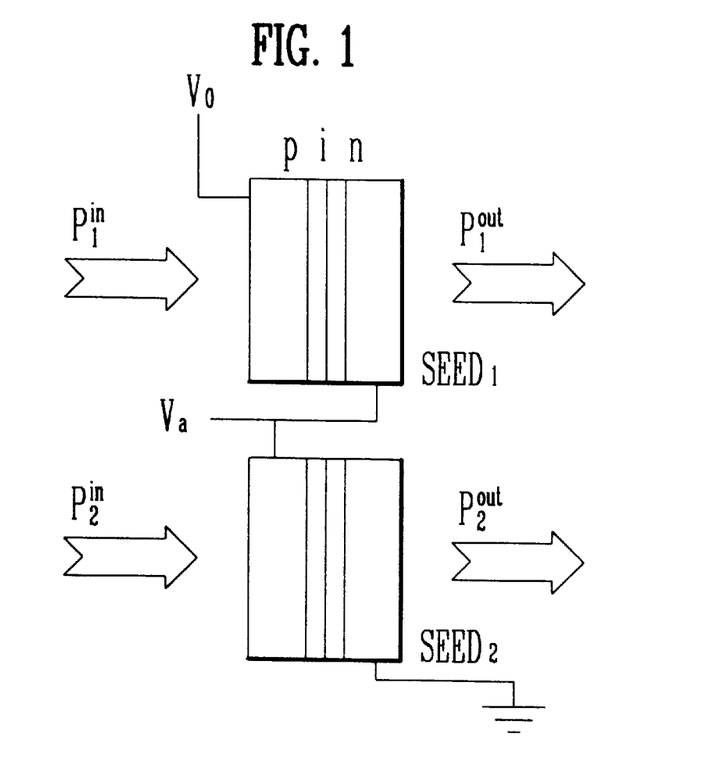
FIG. 1 is a structural view of a symmetrical self electro-optic-effect device which plays the central role in the present invention.

FIG. 1 shows a structure of a symmetrical self electro-optic-effect device which plays the central role in the present invention.

Each self electro-optic-effect device is formed to have p-i-n diode structure having each electrode on and beneath multiple quantum wells for applying high eletric field across the wells.

A symmetrical self electro-optic-effect device is comprised of the same type of two self electro-optic-effect devices, which are electrically connected in series each other, and is usually designed to be applied by a reverse voltage from outside.

The asorption peak of excitons produced by the multiple quantum wells moves toward a lower energy region(i.e. longer wavelength region) as the electric field from outside increases, and therefore absorptance is lowered at the center absorption wavelength without externally applied voltage.

When large and small lights are irradiated to two self electro-optic-effect devices forming the symmetrical self electro-optic-effect device, respectively, the photocurrent in the device being irradiated by the large light is higher than that in the device being irradiated by the small light. Then, since the total voltage remains constant, a large voltage is applied to the device being irradiated by the small light, and therefore absorptance in the device being irradiated by the large light is increased, thereby exhibiting a positve feedback. This results in optical bistability. The self electro-optic-effect devices can be classified by three types.

Figure 2:
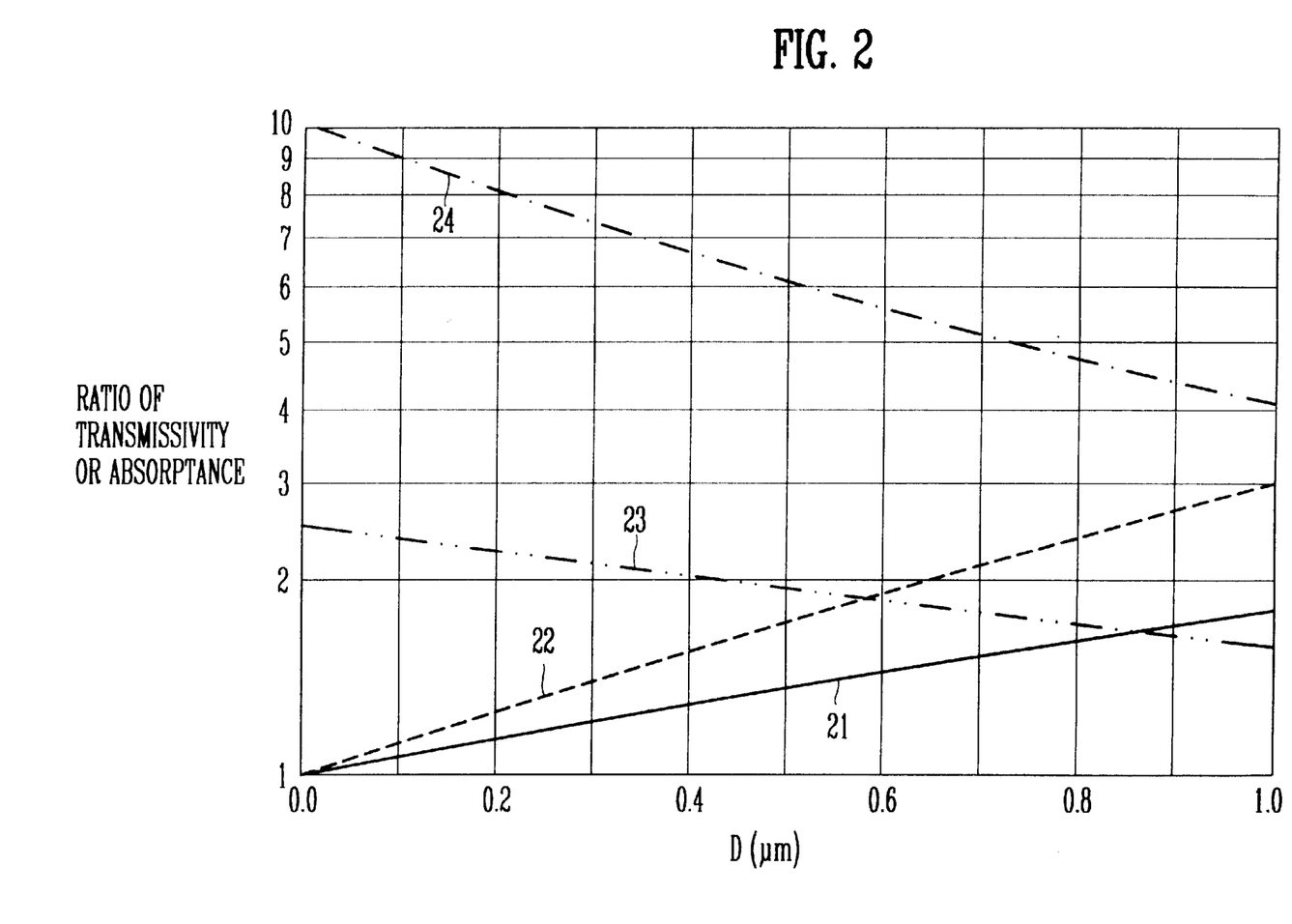
FIG. 2 is a graphical illustration of a ratio of transmissivity and absorptance in a self electro-optic-effect device of a transmission type.

A first one is a transmission type. The device of this type has both faces being anti-reflection coated. When a light is irradiated to multiple quantum wells of the device, some of the incident light is absorbed into the wells while the remainder passes through the wells. In FIG. 2, contrast and asorptance are shown for absorption coefficient change in the transmission type of the device.

FIG. 2 is a graphical illustration of transmissivity and absorptance for absorption coefficient change in the self electro-optic-effect device of the transmission type.

In FIG. 2, reference numeral 21 designates the ratio of the transmissivity of an absorption coefficient 10000/cm case to that of an absorption coefficient 16000/cm case, 22 designates the ratio of the transmissivity of an absorption coefficient 5000/cm case to that of an absorption coefficient 16000/cm case, 23 designates the ratio of the absorptance of an absorption coefficient 10000/cm case to that of an absorption coefficient 16000/cm case, and 24 designates the ratio of the absorptance in an absorption coefficient 5000/cm case to that of an absorption coefficient 16000/cm.

Figure 3:
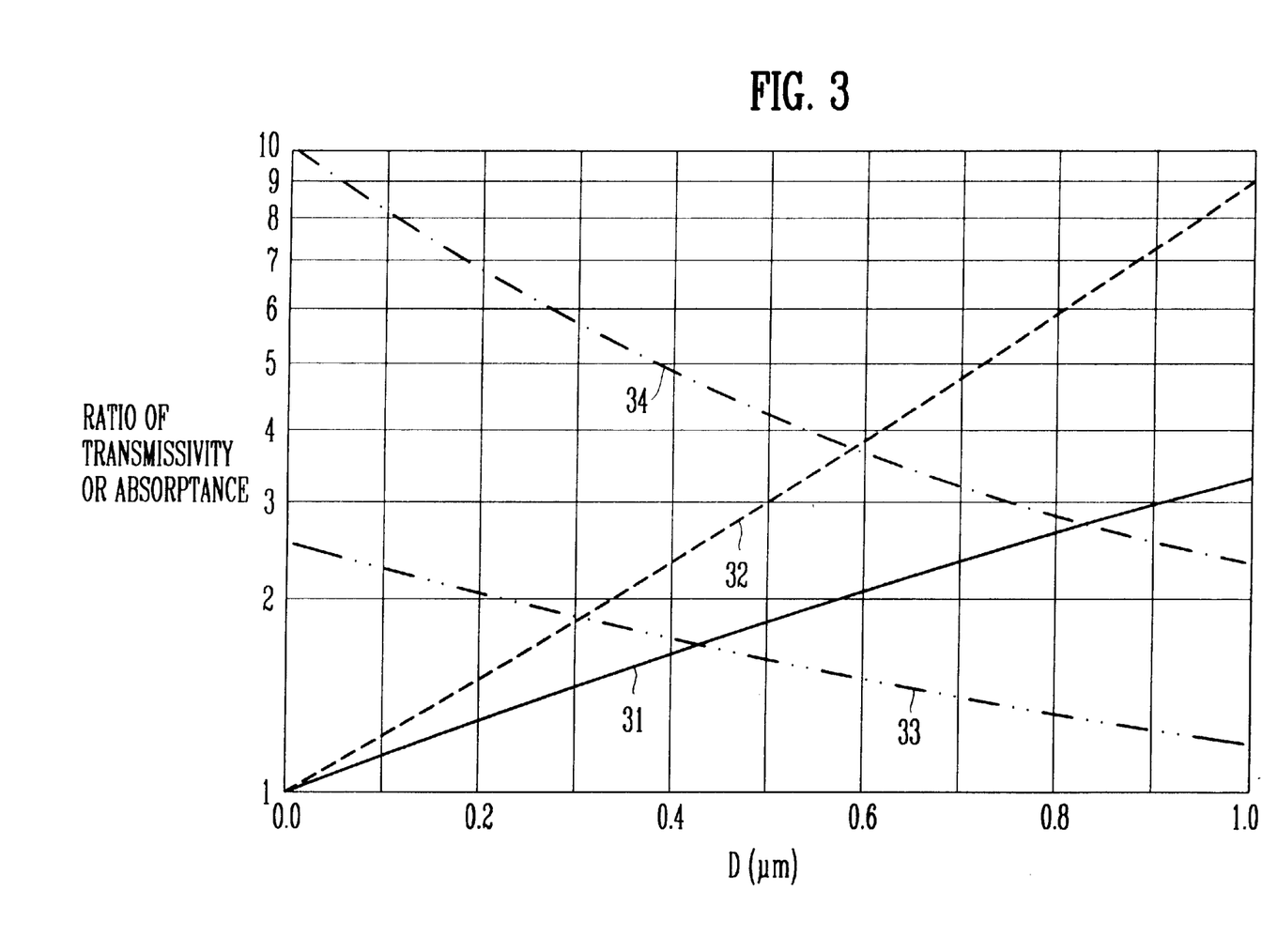
FIG. 3 is a graphical illustration of a ratio of reflectance and absorptance in a self electro-optic-effect device of a simple reflection type.

A second type is a simple reflection. In this type, the symmetrical self electro-optic-effect device has one face which is anti-reflection and the other face on which a mirror is disposed. The device in this type is more efficient, relative to the transmission type device mentioned above, because the optical signals pass through multiple quantum wells twice. In FIG. 3, the ratios of the reflectances and absorptances in the reflection type are shown when the reflectance of the mirror is 0.95.

In FIG. 3, reference numeral 31 designates the ratio of the reflectance of an absorption coefficient 10000/cm case to that of an absorption coefficient 16000/cm case, 32 designates the ratio of the reflectance of an absorption coefficient 5000/cm case to that of an absorption coefficient 16000/cm case, 33 designates the ratio of the absorptance in an absorption coefficient 10000/cm case to that of an absorption coefficient 16000/cm, and 34 designates the ratio of the absorptance in an absorption coefficient 5000/cm case to that of an absorption coefficient 16000/cm case.

Figure 4:
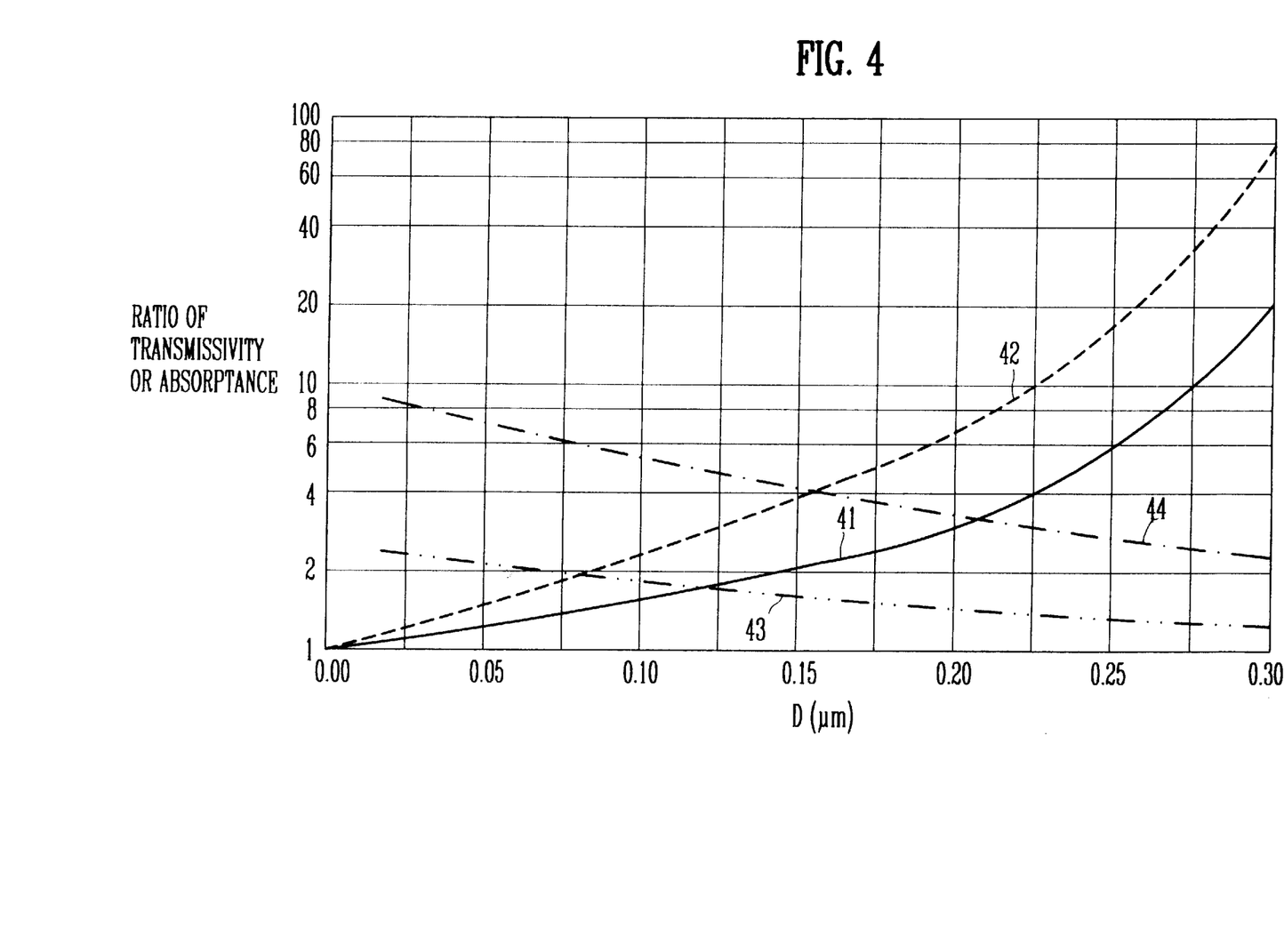
FIG. 4 is a graphical illustration of a ratio of reflectance and absorptance in a self electro-optic-effect device of an asymmetrical Fabry-Perot resonant structure.

A third type is a self electro-optic-effect device of an asymmetric Fabry-Perot resonant structure, having a front face of finite reflectance by means of one mirror and a back face on which the other mirror is disposed.

Thus, enough absorption of the incident signal is obtained because the incident signal passes through the multiple quantum wells several times. In particular, the phase difference in respective incident signals reflected at the front and back faces can be adjusted by means of the distance from one mirror to the other, thereby making total reflectance to vanish.

FIG. 4 is a graphical illustration of reflectance and absorptance in a self electro-optic-effect device of asymmetrical fabri-ferro resonant structure In FIG. 4, reference numeral 41 designates the ratio between the reflectance of an absorption coefficient 10000/cm case and that of an absorption coefficient 16000/cm case, 42 designates the ratio between the reflectance of an absorption coefficient 5000/cm case and that of an absorption coefficient 16000/cm case, 43 designates the ratio between the absorptance in an absorption coefficient 10000/cm case and that of an absorption coefficient 16000/cm case, and 44 designates the ratio between the absorptance of an absorption coefficient 5000/cm case and that of an absorption coefficient 16000/cm case.

In FIG. 4, the reflectance of the front mirror is 0.32 and the reflectance of the back mirror is 0.95.

The voltage from outside is not necessary to obtain the optical bistability of the symmetrical self electro-optic-effect device, when extremely shallow multiple quantum wells (MQWs) are used. It is possible to obtain the optical bistability using only a voltage built in the p-i-n diode without the voltage from outside, and further increased efficiency is obtained in the device of the reflection tpye with the asymmetrical Fabry-Perot resonant structure.

The self-duplication and amplification for the optical signal will be explained.

The self-duplication and the switching are possible by means of symmetrical self electro-optic-effect devices, wherein the optical digital signal includes high or low optical pulses with constant interval, the relative low intensity pulse corresponding to '0' and the relative high intensity pulse corresponding to '1'.

Figure 5:
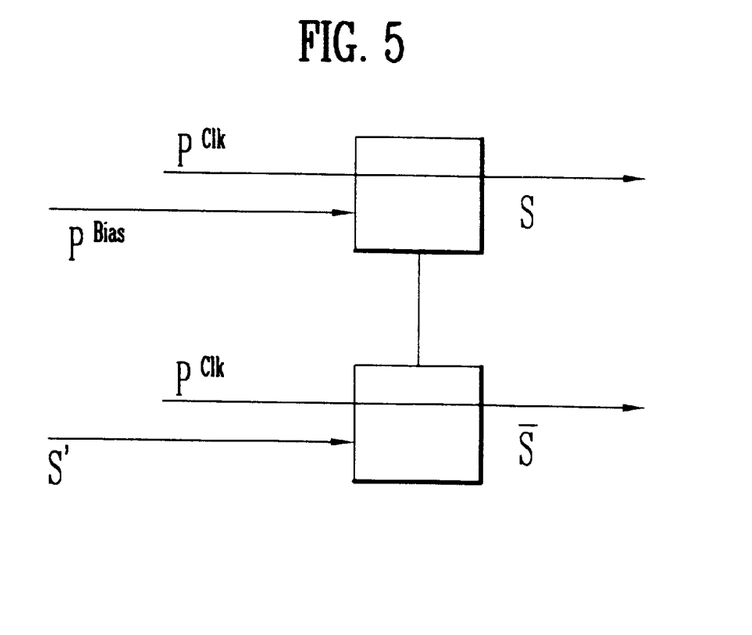
FIG. 5 is an illustration for explaining a principle of self-duplication of an optical digital signal using symmetrical self electro-optic-effect devices.
Figure 7:
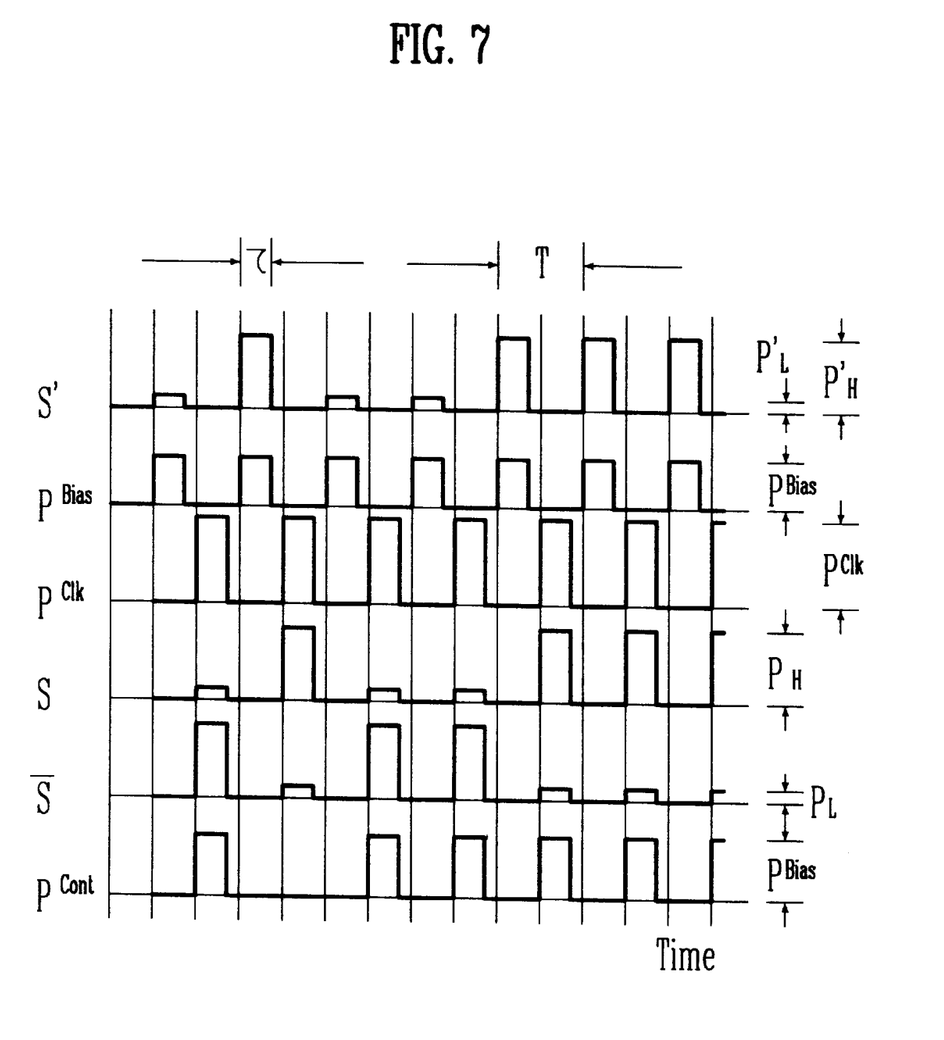
FIG. 7 is an illustration of signals according to FIGS. 5 and 6.

FIG. 5 is an illustration for explaining the process of self-duplication and amplification using symmetrical self electro-optic-effect devices, and FIG. 7 is an illustration of signals.

First, for the self-duplication, the first and the second symmetrical self electro-optic-effect devices are connected each other, wherein to the first device the optical signal S' is irradiated which includes a low signal $P'_L$(logic '0'), and a high signal(logic '1'), and to the second device the optical bias signal $P^{Bias}$ is irradiated which has constant optical intensity.

To obtain normal operation of the symmetrical self electro-optic-effect devices, two relationships of the equations 1, 2 must be established for the maximum and minimum absorptances $A_{max}$, $A_{min}$ of the each device, and also the pulse in FIG. 7 must have enough pulse length t.

$$A_{min}P'_H > A_{max}P^{Bias} \tag{1}$$

$$A_{min}P^{Bias} > A_{max}P'_L \tag{2}$$

Under these conditionships, when every bit of the input optical signal S' is compared with the optical bias signal, the state of the symmetrical self electro-optic-effect device can be determined. If light signals having the same intensity are applied into two optical windows of the devices with the previous determined states, the state of the device is not changed, keeping the previous state.

As shown in FIGS. 5 and 7, in order to detect the respective states of the devices, the optical signals $P^{clk}$ with the same magnitude are incident into the corresponding devices.

That is, if an optical signal S' with an original information is incident into the device, the $P^{clk}$ from the output of the device becomes $\overline{S}$, and if an optical bias signal $P^{Bias}$ is incident, $P^{clk}$ becomes S. The S is completely the same as S' except for phase delay of half period as shown in FIG. 7. On the other hand, the S' and the $\overline{S}$ are in the relationship of the complement. Namely, if one bit of the S is '1', the other corresponding bit in $\overline{S}$ is always '0'.

In addition, it is well appreciated that when the intensity of the optical signal $P^{clk}$ is enlarged for detecting simply the respective states of the devices in FIGS. 5 and 7, the intensities of the signals S, $\overline{S}$ are increased with the same proportion. In other words, the self duplication and amplification for the optical digital signal can be achieved simultaneously by means of the symmetrical self electro-optic-effect devices in the mechanism in FIG. 5.

The optical switching will be explained, which is performed after the self-duplication and amplification for the optical digital packets.

First, an incident optical digital signal is in the form of the packets with constant length, as in the Asynchronous Transfer Mode(ATM).

That is, in the back portion of the packets the user data are written, while in the front portion the address is written for indicating the path to the destination of the data. In fact, both the address and the data employ the optical signals of the same type.

Then, the optical switching can be performed using the symmetrical self electro-optic-effect devices. The address makes it possible for the packet to self-route its destination, and the method of producing such an address will be apparent from the description below.

Figure 6:
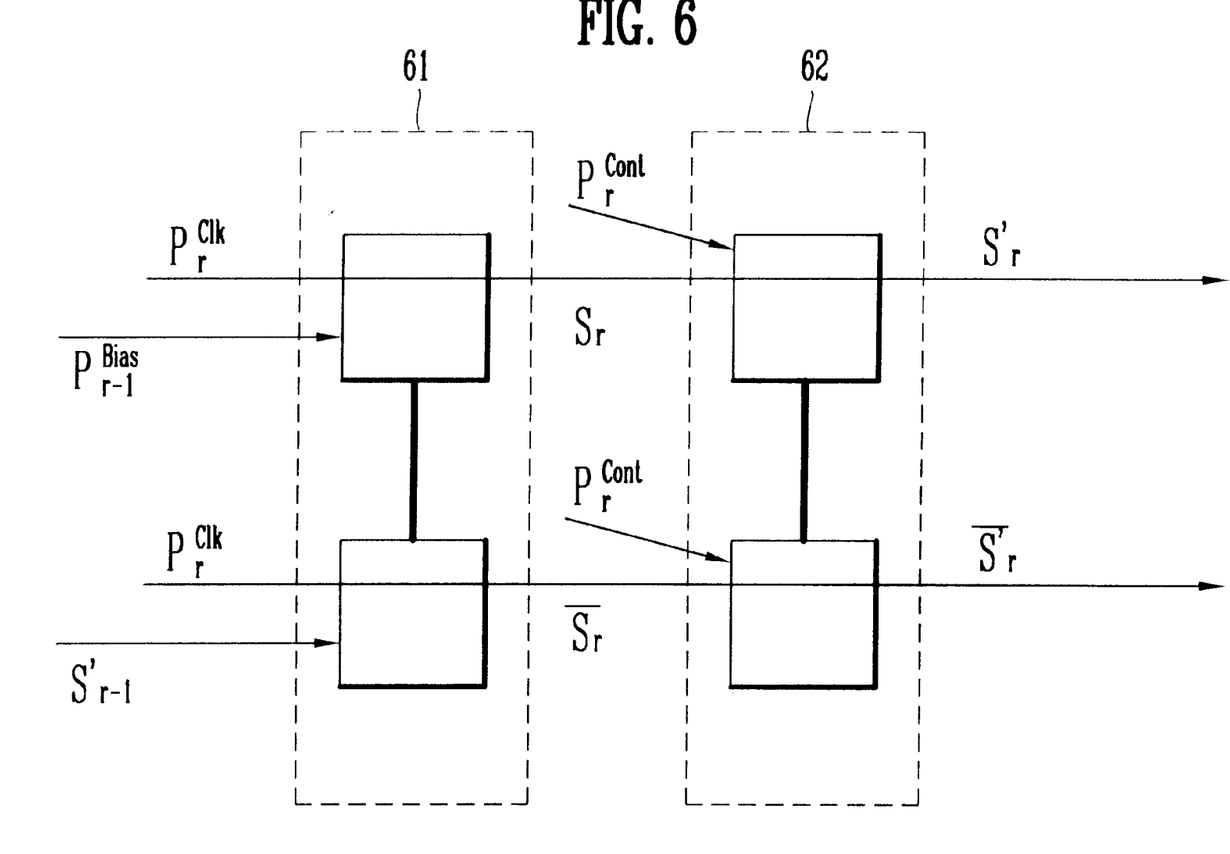
FIG. 6 is an illustration for explaining a principle of optical switching using symmetrical self electro-optic-effect devices.

FIG. 6 is an illustration for explaining the principle of the optical switching using the symmetrical self electro-optic-effect devices.

First, for the optical switching, there are provided a front stage 61 having two self electro-optic-effect devices interconnected and a back stage 62 having two other self electro-optic-effect devices interconnected, the two devices of the back stage receiving optical packets from the two devices of the front stage, respectively.

Thus, the self-duplication and amplification for the incident optical packets is performed in the front stage 61, while the switching for the self-duplicated and amplified packets is performed in the back stage 62.

The equations 1 and 2 must be fulfilled to change the states of the devices as explained above. In other words, as shown in FIGS. 6 and 7, assuming that another optical control signal $P^{cont}$ is put to the devices 62 together with the S and the $\overline{S}$, when the optical control signal $P^{cont}$ is not present, the equation 3 is fulfilled by the $P_L$ and the $P_H$(generally amplified over the $P'_L$ and the $P'_H$) which are signal pair of the S and the $\overline{S}$, changing the state of the device for the input signal in every period. On the other hand, when the optical control signal $P^{cont}$ is present, the equation 4 is fulfilled, keeping the state of the device through the optical control signal $P^{cont}$. It should be noted that the reflected or transmitted lights should not act as noises due to their mixing with any other optical signals. This can be achieved by inclining the directions of the S and the $\overline{S}$ to the direction of the optical control signal $P^{cont}$.

$$A_{min} P_H > A_{max} P_L \qquad (3)$$

$$A_{min}(P_H + P^{cont}) < A_{max}(P_L + P^{cont}) \qquad (4)$$

As shown in FIG. 7, if the optical control signal $P^{cont}$ in specific period is not added to two optical signals S, $\overline{S}$, the states of the symmetrical self electro-optic-effect devices are determined only by the values of the two optical signals, S and $\overline{S}$. Then, one of the devices shows larger absorptance than the other, and if in the following period the optical control signal $P^{cont}$ is added to the two optical signals S, and $\overline{S}$, the state is kept without any change.

The further description will be given for an example of the self electro-optic-effect device of the reflection type.

Figure 8:
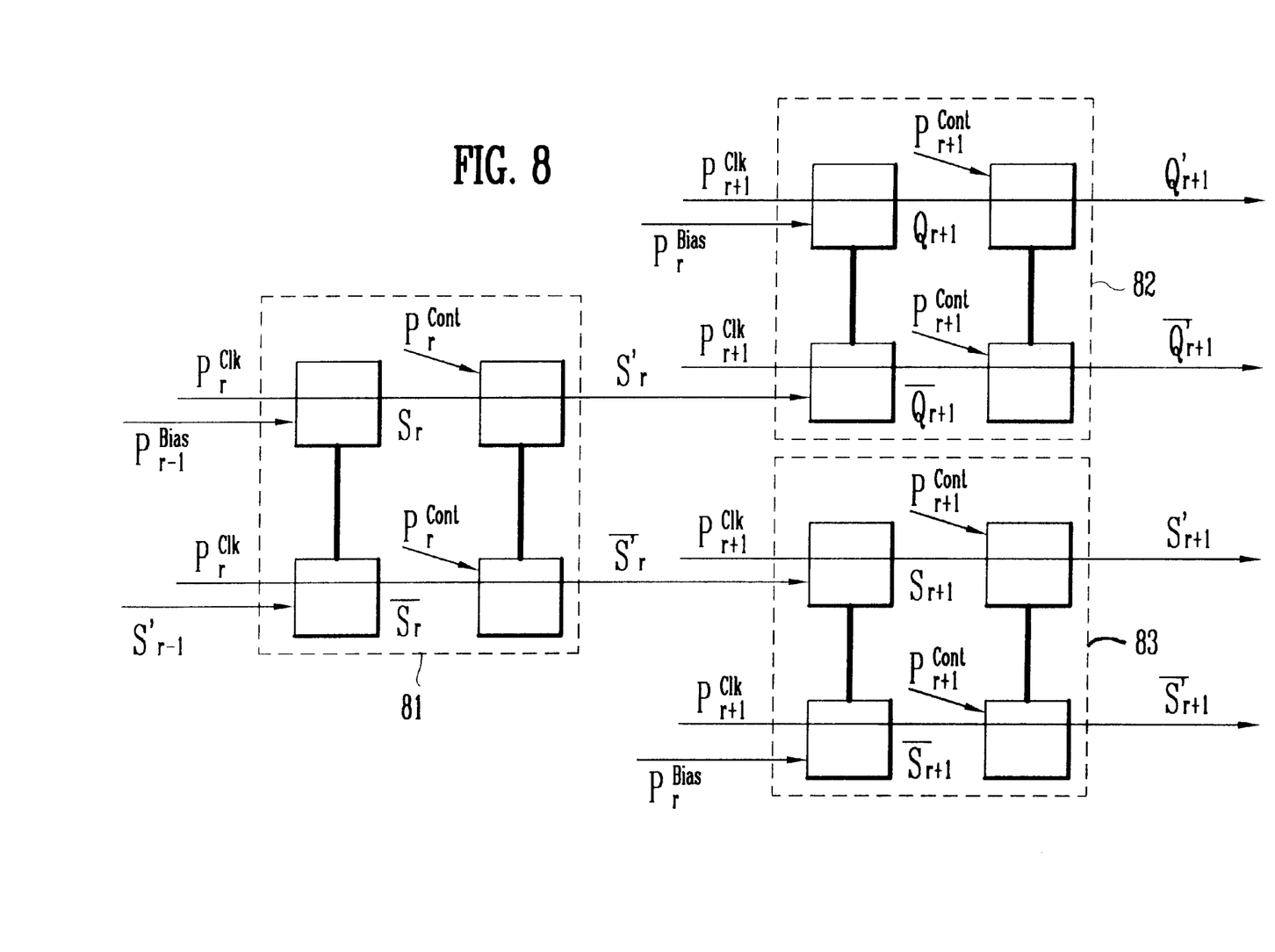
FIG. 8 is a structural view of a multistage optical packet switching apparatus in accordance with the present invention.
Figure 9:
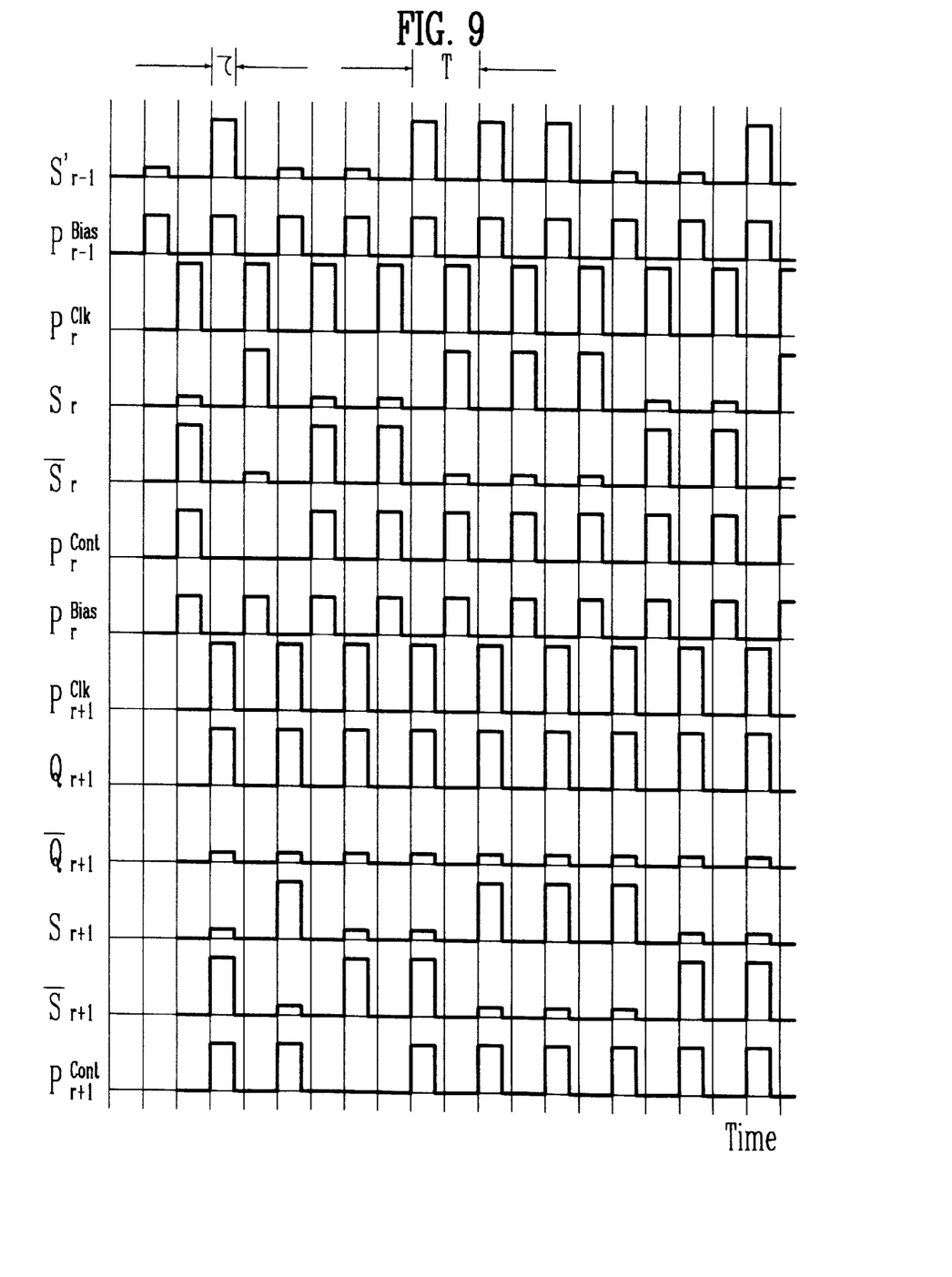
FIG. 9 is an illustration of signals in accordance with the present invention.

FIG. 8 shows a multistage optical packets switching apparatus in accordance with the present invention, and FIG. 9 is an illustration of signals in accordance with the present invention.

The present invention employs optical digital packets with constant length. A packet includes a portion indicating the address of the destination thereof and user data to be transmitted toward the destination thereof. There are no marks for discrimination between the address and the user data. All of the bits have the same wavelength and magnitude(logical values '1' and '0'), and also have constant interval. The number of the bits indicating the address corresponds to the number of the switching nodes. That is, a path in a switching node is determined by an address bit.

The multistage optical packet switching apparatus in accordance with the present invention includes a front stage laving first and second symmetrical electro-optic-effect devices interconnected, and a back stage having third and forth devices interconnected; the input optical signal and an optical signal for detecting the state of the device being applied into the first device of the front stage, an optical bias signal with constant intensity and another optical signal for detecting the state of the device being applied into the second device, thereafter performing self-duplication and amplication for the input optical signal by means of difference in intensities between the optical bias signal and the optical input signal; and the back stage receiving two self-duplicated and amplified signals through the first stage, and receiving an optical control signal for determining the destination to be outputted for thereafter switching self-duplicated and amplified signals.

And, the present invention employs a plurality of the unit switch modules, wherein it is comprised of the multistage structure in the fashion of receiving one of the signals switched from the front stage.

The operation of the optical packet switching apparatus thus constructed will be explained.

The self-duplicated and amplified optical input signal $S_{r-1}$ is inputted from the (r-1)th switching module to r-th switching signal module 81, and in synchronous relation with this signal a bias signal $P_{r-1}^{Bias}$ is also present. Then, an optical clock $P_r^{clk}$ is put having the same period as the $S'_{r-1}$ and $P_{r-1}^{Bias}$, and a delayed phase from those signals, and therefore the signal can detect such a state, wherein the information on $S'_{r-1}$ is retained and the pair of the signals $S_r$ and $\overline{S}_r$ with amplified absolute size are obtained.

The $S_r$ and the $\overline{S}_r$ generated in the front stage are relayed to the back stage for the following switching, and the optical control signal $P_r^{cont}$ is inputted simultaneously for determining whether the logical and the relation operations of the devices are performed or not, as shown in FIGS. 8 and 9.

The information, e.g., the destination of the optical packets is not included in the optical control signal $P^r_{cont}$.

However, since the length of the packets is known, the optical control signal is diminished to zero as shown in FIG. 9 only for the bits for determinating the path in the relevant switching node with period correspondig to the packet length.

Thus, only in that time, the logical operation is performed and the path of the packets is determined, and the remainder of the packet, including the address for the subsequent switching node, is moved by means of the relational operation toward the specified path.

As shown in FIG. 8, two signals $S_r$ and $\overline{S}_r$ become $S'_r$, $\overline{S'}_r$ after switching, and are put to an arbitrary (r+1)th different switching modules 82, 83, respectively.

Then, since each packet of the $S_r$ determines in advance the state of the r-th symmetrical self electro-optic-effect device according to each r-th address bit thereof, the remainder of each packet is subject to the relational operation with same reflectance. One of the packets with the same information as in the signals $S_r$ and $\overline{S}_r$ is reflected with high reflectance $R_H$, while the other is reflected with low reflectance $R_H$, and thus the signals become $S'_r$, $\overline{S'}_r$, respectively.

Then, assuming that the loss is L in the optical path, which connects one device and the other, one of the signals, $S'_r$ and $\overline{S'}_r$ is comprised of the bits of two optical intensities $P^{clk}R_H^2L^2$ and $P^{clk}R_HR_LL^2$ However, since the other has the intensities $P^{clk}R_HR_LL^2$ and, $P^{clk}R_L^2L^2$ which are the contrast ratio($=R_H{}_{/RL}$) of the device smaller, when a threshold $P^{Bias}$ for separating logic '1' and logic '0' is determined between $P^{clk}R_H^2L^2$ and $P^{clk}R_HR_LL^2$ the information is continuously transmitted toward one side while, in the other side, all bits of the information is regarded as logic '0', thereby transmitting no information in the optical packets any more.

Now, when $P^{Bias}$ is determined to meet a condition of the equation 5 below from the equations 1 and 2, the actual switching is performed.

$$\frac{A_{\min}}{A_{\max}} P^{clk} R_H^2 L^2 > P^{Bias} > \frac{A_{\max}}{A_{\min}} P^{clk} R_H R_L L^2 \quad (5)$$

For example, as shown in FIG. 9, when the optical signal $P_r^{cont}$ is diminished to zero(i.e. r-th address bit), the optical signal bit of $S_r$ is higher than that of $\overline{S}_r$.

Thus, since the higher optical signal is inputted to the second (upper) of the symmetrical self electro-optic-effect devices for the r-th self-duplication and amplification in FIG. 8 and, as a result, the absorptance of the second device is higher than that of the first (lower) device, the reflectance of the second device becomes $R_L$ while the reflectance of the first becomes $R_H$.

The symmetrical self electro-optic-effect devices perform only the relational operation by means of the optical signal $P_r^{cont}$ for the remainder of the optical packet bits, and therefore all bits of the optical packets lower relative to $P^{Bias}$ in FIG. 5, and become '0' in the $Q_{r+1}$ and '1' in the $\overline{Q}_{r+1}$.

The optical signal $\overline{S}_r$ is subject to self-duplication and amplification in the (r+1)th switching module 83, as in an arbitrary r-th switching module 81, and then the switching is performed for the signal.

In the 1×N switching mechanism, in fact, all of the N possible destinations receive continuous optical packets, but only one of the destinations receives original data packets intended to be transmitted while the remainders receive meaningless packets including only logic '0' or '1'. The data packets are divided into the meaning packets and the meaningless packets by preventing the meaning packets from including only '0' or '1'.

A ratio of reflectance to absorptance can be derived from the equations 1 and 2, as given below:

$$\frac{R_H}{R_L} > \left(\frac{A_{\max}}{A_{\min}}\right)^2 \quad (6)$$

Since this is only a requirement and, in fact, the switching is performed within a duration of an optical pulse in FIGS. 7 and 9 in despite of noises in light sources, the larger difference in the magnitudes is desirable.

There are features of meeting the equation 6 defined for three type of self electro-optic-effect devices in FIGS. 2 and 4. As it has thick multiple quantum well layers, the self electro-optic-effect device of the permeation or the simple reflection type has an excellent features related to the equation 6.

However, as the actual quantum well layers have larger thickness, for instance, a problem related to a growth of the layers is caused, and in paricular in order to maintain the electric field of the same intensity, a problem that a voltage applied across the wells must be increased proportionally to the thickness of the wells is also caused. Such a high voltage is attributed to several additional problems.

The problems can be avoided by using an asymmetrical Fabry-Perot resonant structure. It is well appreciated from FIG. 4 that with the multiple quantum wells having one tenths thickness, excellent ratio can be obtained to meet the equation 6.

If shallow quantum wells(x>0.05) are used instead of deep wells(x>>0.25), in multiple wells of AlxGa1-xAs/ GaAs, the features mentioned above is attained using only a voltage built in the p-i-n diode structure of the self electro-optic-effect device without a voltage provided from outside.

When no voltage from outside is needed by using the symmetrical self electro-optic-effect device of the asymmetrical Fabry-Perot resonant structure with such shallow quantum wells, power supply is no longer requird, whereby obtaining the simplified geometric structure and each electrically independent self electro-optic-effect device, thus resulting in the advantages that the performance deterioratin of any self electro-optic-effect device is not propagated to other device. Above all, an all-optical switching is achieved in that only the optical signal is required to activate the optic-packet switching apparatus.

In implementing the constiution described above, it needs to hold each symmetrical self electro-optic-effect device and connect optically each device. One effective method includes an integrated plannar optics. When symmetrical self electro-optic-effect devices and other necessary optical devices are disposed using both sides of a glass having constant thickness, it can be realized that the 1×N optic-packet switching apparatus can have small volume and operate with only the optical signal without electrial connection from outside.

Although the preferred embodiment of the present invention has been described in detail, it should be understood that various changes, substititions and alternations can be made therein without departing from spirit and scope of the inventions as defined by the appended claims.

To overcome the problems mentioned above, the present invention employs a symmetrical self electro-optic-effect device as an element. By using the matrix, three dimentional free space switching is possile, whereby realizing easily a large parallel switching. Since a symmetrical self electro-optic-effect device always operates by comparing relative magnitudes of two optical signals, it is highly resistive against noises included in optical sources.

The mechanism suggested by the present invention is based on an optical digital packet with constant length. Since special constraints are not imposed to the packet length, there are versatilities in utilizing the mechanism according to any given conditions. Each optical packet travels its destination by means of its address, and it is never required to take further operation from outside. The address portion and the data portion of the packet have optical signals each having the same wavelength and format, and therefore problems such as colour dispersion are not caused. The use of the same wavelength for all optical signals does not need to have complicated light sources.

The mechanism is based on 1×2$^m$ switching, and however, in fact, the manipulation to an arbitrary number N of 1×N is simply achieved. For N destinations, m switching nodes are used where $N \leq 2^m$. Also, it is necessary to add a switching node in order to prevent any switched last data packets from establishing a complement ralation with previous date packets.

The basic mechanism of the present invention can be also implemented using symmetrical self electro-optic-effect devices of the transmission or simple reflection type. This case, however, requires to provide each symmetrical self electro-optic-effect device with a constant DC voltage from outside. The use of a muliple of shallow quantum wells together with an asymmetrical fabry-Perot resonant structure does not require the voltage from outside, thereby performing the switching by supplying only optical signal with single wavelength from outside.

When such a structure for the optical packet switching apparatus is implemented using integrated plannar optics, optical exchange mechanism may have the very small volume. In particular, such an optical packet swithcing apparatus with simple structure, not required to have a power supply, facilitates mass production.

What is claimed is:

1. A multistage optical packet switching apparatus comprising:

a self-duplication and amplification means including at least two interconnected symmetrical self electro-optic-effect devices, each device receiving an input optical signal transmitted from a unit switching module in a front stage, receiving an outside optical bias signal of constant intensity and an optical signal for detecting a state of a self electro-optic-effect device, performing self-duplication and amplification based on a difference in signal intensities of respective bits of the optical bias signal and the input optical signal, and generating a self-duplicated and amplified optical signal;

a switching means having at least two interconnected symmetrical self electro-optic-effect devices, each device receiving the self-duplicated and amplified optical signal from said self-duplication and amplification means and an optical control signal for determining a destination for the input optical signal, and outputting the input optical signal by varying reflectance based on signal intensity of bits indicating an address to be output of bits of the self-duplicated and amplified optical signal; and a first unit switching module for receiving as input an optical signal having a relatively low reflectance among unit switching modules in back stage and outputting a meaningless optical signal through self-duplication and amplification; and a second unit switching module, receiving as input an optical signal having relative high reflectance among unit switching modules in back stage and generating an optical signal for transmission to a following state through self-duplification and amplification.

2. The apparatus in accordance with claim 1, wherein said self electro-optic-effect devices are transmission devices having multiple quantum wells and a portion of the optical input signal is absorbed in the multiple quantum wells and the remainder passes through the multiple quantum wells.

3. The apparatus in accordance with claim 1, wherein said self electro-optic-effect devices are simple reflection devices having two faces with an antireflective coating on one face and a mirror disposed on the other face, and multiple quantum wells through which the optical input signal passes through twice.

4. The apparatus in accordance with claim 1, wherein said self electro-optic-effect devices are an asymmetrical Fabry-Perot resonant device including multiple shallow quantum wells, a front face having a mirror and a back face coated with a reflective material having a predetermined reflectance.

* * * * *